(12) United States Patent
Shugen

(10) Patent No.: US 9,914,627 B2
(45) Date of Patent: *Mar. 13, 2018

(54) THREE-MAST ORDER PICKER

(71) Applicant: ZHEJIANG DINGLI MACHINERY CO., LTD., Huzhou (CN)

(72) Inventor: Xu Shugen, Huzhou (CN)

(73) Assignee: Zhejiang Dingli Machinery Co., Ltd., Huzhou (CN)

( * ) Notice: Subject to any disclaimer, the term of this patent is extended or adjusted under 35 U.S.C. 154(b) by 161 days.

This patent is subject to a terminal disclaimer.

(21) Appl. No.: 14/942,053

(22) Filed: Nov. 16, 2015

(65) Prior Publication Data

US 2017/0137271 A1  May 18, 2017

(51) Int. Cl.
*B66F 11/04* (2006.01)
*B65G 1/04* (2006.01)

(52) U.S. Cl.
CPC ............ *B66F 11/04* (2013.01); *B65G 1/0492* (2013.01)

(58) Field of Classification Search
CPC ........ B66F 9/205; B66F 11/04; B66F 17/006; E04G 5/141
See application file for complete search history.

(56) References Cited

U.S. PATENT DOCUMENTS

| | | | | |
|---|---|---|---|---|
| 3,031,027 A * | 4/1962 | Mitchell | .................. | B66F 11/04 182/148 |
| 4,258,825 A * | 3/1981 | Collins | .................. | B66F 11/04 180/321 |
| 4,858,775 A * | 8/1989 | Crouch | .................. | B66B 9/00 212/312 |
| 5,203,425 A * | 4/1993 | Wehmeyer | .............. | B66F 11/04 182/113 |
| 6,349,793 B1 * | 2/2002 | Kincaid | .................... | E06C 5/02 182/141 |
| 7,281,736 B2 * | 10/2007 | Sannah | .................. | B66F 17/006 182/141 |
| 7,527,466 B2 * | 5/2009 | Simmons | ................ | B66F 11/04 182/150 |

(Continued)

FOREIGN PATENT DOCUMENTS

| | | | | |
|---|---|---|---|---|
| CN | 201095585 Y | | 8/2008 | |
| GB | 2484706 A | * | 4/2012 | ............. E04G 5/141 |

(Continued)

*Primary Examiner* — James W Keenan
(74) *Attorney, Agent, or Firm* — NK Patent Law, PLLC

(57) ABSTRACT

The present invention relates to a three-mast order picker, belonging to the technical field of manned elevation equipment. The three-mast order picker comprises a chassis, a hydraulic elevation assembly, a sprocket elevation assembly and a picker platform, the hydraulic elevation assembly comprises a fixed mast, a hydraulic cylinder and a movable mast, and the sprocket elevation assembly comprises a sprocket and a chain. The fixed mast is erected and fixed on the chassis, and the knockout rod of the hydraulic cylinder is connected to the movable mast to drive the movable mast; one end of the chain is connected to the fixed mast and the other end is connected to the second movable mast so that the second movable mast is raised and lowered by the raising and lowering of the movable mast and with the assistance of the sprocket and the chain.

3 Claims, 12 Drawing Sheets

(56) References Cited

U.S. PATENT DOCUMENTS

| | | | | |
|---|---|---|---|---|
| 7,926,619 | B2 * | 4/2011 | Stein | B66F 9/07504 |
| | | | | 187/226 |
| 9,108,831 | B2 * | 8/2015 | Beji | B66F 11/04 |
| 2009/0096231 | A1 * | 4/2009 | Burlingame | B66F 11/04 |
| | | | | 294/68.3 |
| 2009/0217591 | A1 * | 9/2009 | LaCook | E05D 11/06 |
| | | | | 49/50 |
| 2017/0137269 | A1 * | 5/2017 | Shugen | B65G 1/0492 |
| 2017/0137270 | A1 * | 5/2017 | Shugen | B65G 1/0492 |

FOREIGN PATENT DOCUMENTS

| | | | | | |
|---|---|---|---|---|---|
| GB | | 2503702 A | * | 1/2014 | E04G 5/141 |
| WO | WO 99/41186 | A1 | * | 8/1999 | B66F 11/04 |
| WO | WO 2014/030000 | A1 | * | 2/2014 | B66G 11/04 |

* cited by examiner

THREE-MAST ORDER PICKER

BACKGROUND OF THE INVENTION

1. Technical Field

The present invention relates to a three-mast order picker, belonging to the technical field of elevation equipment, and more particularly, to the technical field of manned elevation equipment.

2. Description of Related Art

Many methods are available for taking down aerial objects, among which the most safe and convenient one is to draw a man up to objects so as to enable the man to reach the objects directly. Order pickers are based on the idea. However, order pickers have a wide variety of structures, and the structure thereof determines their application. Take the display shelves in a large supermarket for example: the shelves are over 2 m high, so it requires some means to take down the objects high on the shelves. The commonly used scissor elevation platform has potential safety hazards, while mast order pickers can solve this problem; therefore, mast order pickers enjoy a bright prospect in applications such as supermarkets and warehouses.

However, the order picker above has a limited elevation height, so the dimensions have to be increased to obtain an order picker, which can reach a higher position, but this will significantly raise the cost. For this reason, there is a great need for an order picker, which can reach a higher position without changing its original dimensions.

BRIEF SUMMARY OF THE INVENTION

To solve the technical problem mentioned above, the present invention provides a three-mast order picker.

The present invention adopts the following technical solution to solve the technical problem mentioned above:

The three-mast order picker comprises a chassis, a hydraulic elevation assembly, a sprocket elevation assembly and a picker platform. The hydraulic elevation assembly comprises a fixed mast, a hydraulic cylinder and a movable mast, and the sprocket elevation assembly comprises a sprocket and a chain. The fixed mast is erected and fixed on the chassis, and the knockout rod of the hydraulic cylinder is connected to the movable mast to drive the movable mast. It also comprises a second movable mast as the elevation object of the sprocket elevation assembly and a second sprocket elevation assembly with the picker platform as its elevation object. The second sprocket elevation assembly comprises a second sprocket and a second chain. One end of the chain is connected to the fixed mast and the other end is connected to the second movable mast so that the second movable mast is raised and lowered by the raising and lowering of the movable mast and with the assistance of the sprocket and the chain. The picker platform is raised and lowered by the raising and lowering of the second movable mast and with the assistance of the second sprocket and the second chain.

Preferably in the technical solution above, one end of the second chain is connected to the movable mast and the other end is connected to the picker platform.

Preferably in the technical solution above, the chassis is provided with a drawer in which the hydraulic oil pump of the hydraulic cylinder, a controller and a battery are placed. The power wire and signal wire of the hydraulic oil pump, the controller and the battery come out from the drawer, go through the drag chain arranged at the chassis and are movably installed at a fixed position.

Preferably in the technical solution above, the chassis is provided with two front driven omni-directional wheels and two rear driving directional wheels, wherein the two rear driving directional wheels drive the order picker in a non-coaxial way so that the forward, backward and steering motions of the order picker are determined by the direction of rotation and the difference of rotation speed of the two rear driving directional wheels.

Preferably in the technical solution above, between the fixed mast and the movable mast are provided with one or more guide elements, which is/are guided by the corresponding piece(s). The guide element(s) is/are arranged on the movable mast while the corresponding piece(s) is/are arranged on the fixed mast, or the guide element(s) is/are arranged on the fixed mast while the corresponding piece(s) is/are arranged on the movable mast.

Preferably in the technical solution above, between the fixed mast and the movable mast are also provided with one or more directional elements, which is/are guided by the corresponding piece(s). The directional element(s) is/are the directional wheels arranged on the movable mast while the corresponding piece(s) is/are the C-like folded face(s) formed by the internal surface of the fixed mast. The diameter of the directional wheels is less than the width of the C-like folded faces; in elevation, rolling friction is generated between the directional wheel(s) and one face of the C-like folded face(s) so that the directional wheel(s) mounted on the movable mast is/are raised and lowered while the C-like folded face(s) formed by the internal surface of the fixed mast is/are not raised or lowered.

Preferably in the technical solution above, the guide element(s) is/are mounted at the upper part of the fixed mast and the directional element(s) is/are mounted at the lower part of the movable mast; in elevation, when the directional element(s) contact(s) that the mounts of the guide element(s), the three-mast structure is at the maximum height.

Preferably in the technical solution above, between the movable mast and the second movable mast are provided with one or more guide elements, which is/are guided by the corresponding piece(s). The guide element(s) is/are arranged on the movable mast while the corresponding piece(s) is/are arranged on the second movable mast, or the guide element(s) is/are arranged on the second movable mast while the corresponding piece(s) is/are arranged on the movable mast.

Preferably in the technical solution above, between the movable mast and the second movable mast are also provided with one or more directional elements which is/are guided by the corresponding piece(s). The directional element(s) is/are the directional wheels arranged on the second movable mast while the corresponding piece(s) is/are the C-like folded face(s) formed by the internal surface of the movable mast. The diameter of the directional wheels is less than the width of the C-like folded faces. In elevation, rolling friction is generated between the directional wheel(s) and one face of the C-like folded face(s) so that the directional wheel(s) mounted on the second movable mast is/are significantly raised and lowered while the C-like folded face(s) formed by the internal surface(s) of the movable mast is/are slightly raised or lowered.

Preferably in the technical solution above, the guide element(s) is/are mounted at the upper part of the movable mast and the directional element(s) is/are mounted at the lower part of the second movable mast; in elevation, when the directional element(s) contact(s) that the mounts of the guide element(s), the three-mast structure is at the maximum height.

Preferably in the technical solution above, between the second movable mast and the picker platform are also provided with multiple directional elements, which are guided by the corresponding pieces. The directional elements are rollers with an appropriate diameter, arranged on the mounting plate, the mounting plate is arranged on the picker platform and kept in parallel with the second movable mast, the axle of the directional wheels is kept vertical to the side face of the picker platform, and the corresponding piece of the directional elements is formed by the internal surface of the post of the second movable mast. I.e. the directional element is arranged inside the post of the second movable mast.

Preferably in the technical solution above, the picker platform is provided with a split-type dual front door and two scissor-type side doors, wherein the dual front door, mounted on the skeleton of the picker platform through stops and torsion springs, is opened by "pushing", and once the pushing force is removed, the force generated by the torsion springs brings the dual front door back and the stops limit it in place. Thus, the dual front door is closed; one end of the scissor-type side doors is hinged to one position of the skeleton and the other end is fastened to another position of the skeleton by means of bolts.

Preferably in the technical solution above, the chassis is provided with brake prop feet. When the brake prop feet are actuated, the brake prop feet push against the surface carrying the order picker so that at least some gravity of the order picker is distributed to the brake prop feet so as to generate static friction force and bring the order picker to a stop.

Preferably in the technical solution above, the order picker also comprises a wiring mechanism which comprises a wire, a first guide pulley, a first wire fixing point, a second guide pulley/pulley block, a movable pulley, a clump weight, a guide path, a third guide pulley and a second wire fixing point; the wire coming out from the picker platform forms a wire fixing point on the movable mast after its direction is changed by the first guide pulley, is tensioned by the movable pulley after the direction is changed again by the second guide pulley/pulley block, and fixed onto the bottom of the fixed mast or the chassis to form a second wire fixing point after passing through the third guide pulley. The second guide pulley/pulley block is mounted on the movable mast, the second movable pulley is rotatably mounted on the clump weight, the clump weight is slidingly mounted on the guide path, and the guide path is fixed on the bottom of the fixed mast or the chassis.

Preferably in the technical solution above, the chassis is also provided with a pothole assembly which comprises a flip, a jack catch, a lower link, a middle link and struts, wherein the upper end of the strut movably mounted in a bushing is to be pressed by the picker platform while the lower end props against the roller rotatably connected to one end of the middle link, the other end of the middle link is rotatably connected to one end of the lower link, the other end of the lower link is movably connected to one end of the jack catch, and the jack catch is intended for catching or being welded to the flip. The middle of the middle link is rotatably connected to the base plate through a first axle, and the other end of the jack catch is rotatably connected to the base plate through the second axle. When the order picker is lowered, the top end of the strut is pressed so that force is transmitted to one end of the middle link through the roller(s), to the other end of the middle link through the rotation of the middle link and then to the lower link which transmits a part of the force to the jack catch and the other part of the force to the gas rod, and the gas rod is retracted and accumulates potential energy; at the same time, the jack catch catching or welded to the flip stows the flip. When the picker platform is raised, the pressure applied on the top end of the strut is removed, the potential energy stored in the gas rod is converted to actuate the gas rod which acts on the lower link by means of force to drive the flip to erect and restores the strut through force transmission to be pressed again by the picker platform; when the flip is erected, it can prevent the overall machine from falling into potholes.

To sum up, the present invention has the following beneficial effects:

1. The present invention, adopting a three-mast structure, can reach a higher position without changing the dimensions of the overall machine and have the advantage of safe and steady elevation;

2. The elevation of the present invention is confined within an elevation passage and realized through the guide element(s) and the corresponding piece(s) thereof together with the directional element(s) and the corresponding piece(s) thereof, and the elevation is steady and smooth;

3. The hydraulic oil pump, battery, controller and other devices are placed in a drawer according to the present invention so that in case of a fault, it will be a great convenience to pull out the drawer directly for maintenance;

4. Preferably, the traveling mechanism of the present invention is electric and the forward, backward, steering and turning-around motions are realized by controlling the direction of rotation and/or the speed difference of the two rear driving wheels; preferably, both the rear driving wheels are controlled by the separate motors respectively;

5. In case that the traveling mechanism of the present invention is mobile, i.e. an external force is needed to realize the movement of the present invention, a brake prop feet is needed so that actuation of the brake prop feet in parking can help stop the present invention and keep it immobile to the ground; alternatively, other braking mechanisms can be mounted;

6. The front door of the picker platform of the present invention is a self-closing structure which will close automatically after an operator pushes the door and comes onto the platform; the side doors of the present invention is a scissor-type structure and locked by means of bolts, improving the safety;

7. A pothole assembly is provided in the present invention so that the flip is erected when the picker platform is raised which can prevent the overall machine from falling into potholes; the flip is stowed and gathered at the bottom of the chassis when the picker platform is lowered to a certain position.

In the figures, 1—chassis, 5—picker platform, 8—guide element, 9—directional element, 10—mounting plate;

1-1—drawer, 1-2—front driven omni-directional wheel, 1-3—rear driven directional wheel, 1-4—brake prop foot;

1-10—flip, 1-11—jack catch, 1-12—second axle, 1-13—lower link, 1-14—middle link, 1-15—first axle, 1-16—strut, 1-17—base plate;

2-1—fixed mast, 2-2—hydraulic cylinder, 2-3—movable mast;

3-1—sprocket, 3-2—chain, 3-3—second movable mast;

4-1—second sprocket, 4-2—second chain;

5-1—split-type dual front door, 5-2—stop, 5-3—torsion spring, 5-4—skeleton, 5-5—scissor-type side door, 5-6—bolt;

6-1—wire, 6-2—first guide pulley, 6-3—first wire fixing point, 6-4—second guide pulley/pulley block, 6-5—movable pulley, 6-6—clump weight, 6-7—guide post, 6-8—third guide pulley, 6-9—second wire fixing point; 8-1—mount, 8-2—wide roller and 8-3—plane;

9-1—directional wheel, 9-2-C—like folded face.

DETAILED DESCRIPTION OF THE INVENTION

The present invention will be further detailed hereinafter with the accompanying figures.

The embodiments are intended only for describing the present invention but not to limit the present invention. The patent law protects any changes made by those skilled in the present invention after reading the specification and within the scope of the claims.

Embodiment I

Figure 1:
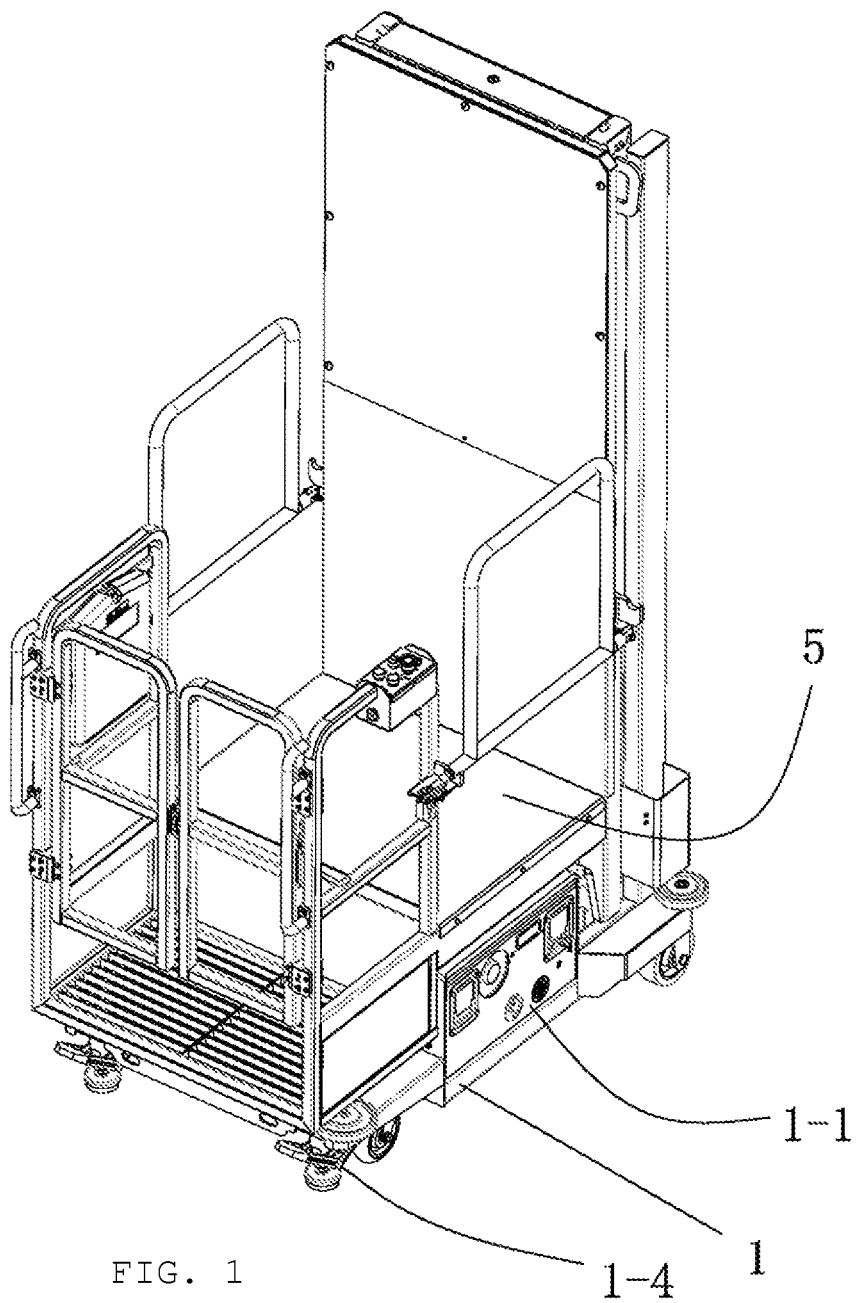
FIG. 1 is an overall structural diagram of Embodiment I according to the present invention.

A three-mast order picker, having a chassis 1, an elevation structure and a picker platform 5. The overall structure is shown in FIG. 1, wherein the chassis 1 is provided with wheels at the bottom, but the wheels cannot rotate of themselves, so the overall machine has to rely on external forces for movement. Each of the front wheels is provided with a brake prop 1-4 foot at the side, so that when the brake prop feet 1-4 are actuated, the brake prop feet 1-4 push against the surface carrying the order picker to distribute at least some gravity of the order picker to the brake prop feet 1-4 so as to generate static friction force and bring the order picker to a stop.

Figure 2:
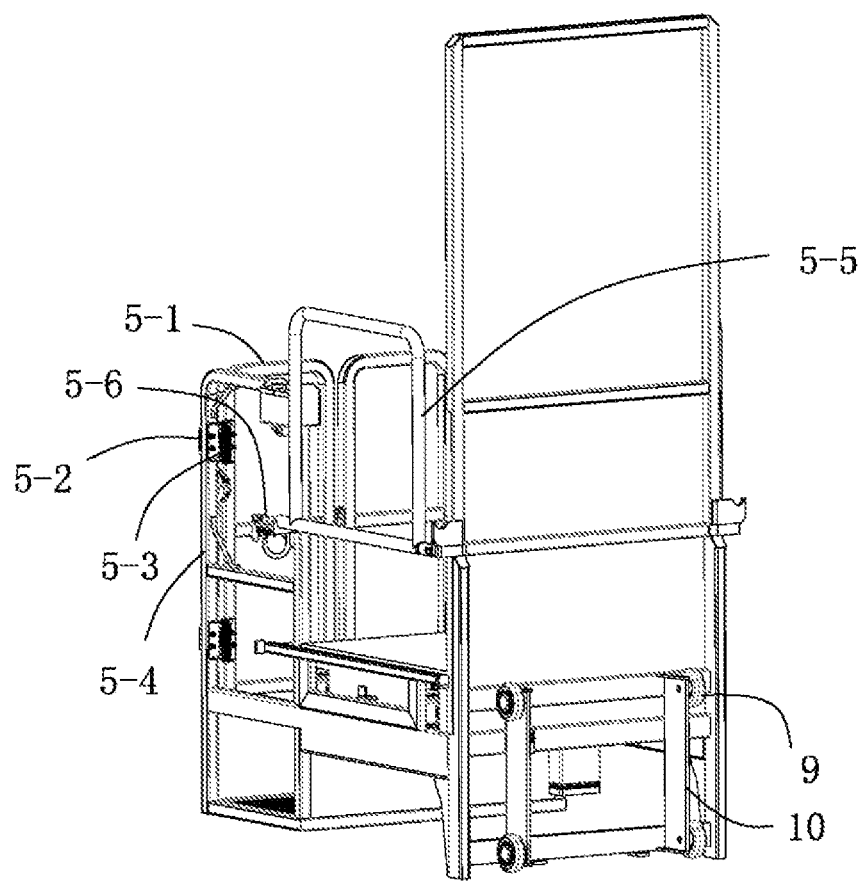
FIG. 2 is a structural diagram of the picker platform according to the present invention.

FIG. 2 shows a structural diagram of the picker platform 5 of the order picker. The picker platform 5 is provided with a split-type dual front door 5-1 and two scissor-type side doors 5-5, wherein the dual front door 5-1, mounted on the skeleton 5-4 of the picker platform 5 through stops 5-2 and torsion springs 5-3, is opened by "pushing", and once the pushing force is removed, the force generated by the torsion springs 5-3 brings the dual front door 5-1 back and the stops 5-2 limit it in place. Thus, the dual front door 5-1 is closed; one end of the scissor-type side doors 5-5 is hinged to one position of the skeleton 5-4 and the other end is fastened to another position of the skeleton 5-4 by means of bolts 5-6.

Figure 3:
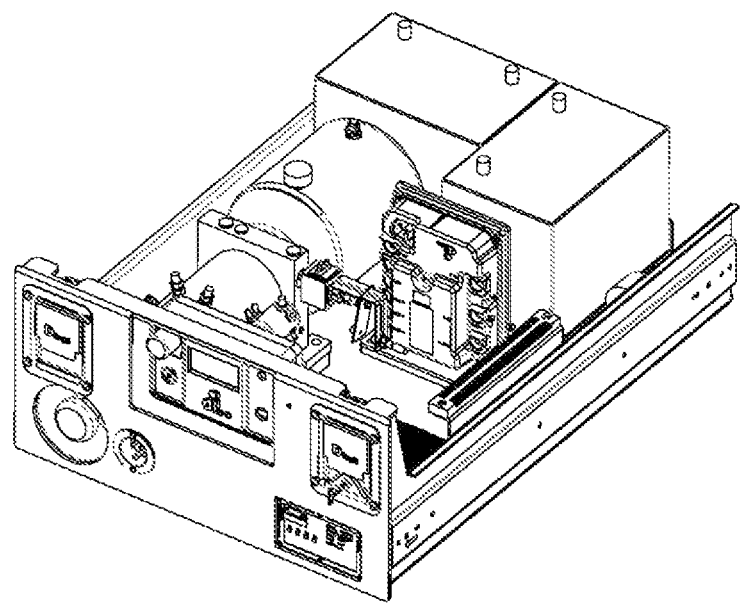
FIG. 3 is a structural diagram of the drawer according to the present invention.

As shown by 1-1 in FIG. 1 and FIG. 3 is a structural diagram of the drawer according to the present invention. The hydraulic oil pump of the hydraulic cylinder, a controller, a battery and other devices are placed in the drawer 1-1; the power wire and signal wire of the hydraulic oil pump, the controller and the battery come out from the drawer 1-1, go through the drag chain arranged at the chassis 1 and are movably installed at a fixed position. The drawer 1-1 is arranged at the bottom of the chassis 1 through guide rails.

Figure 8A:
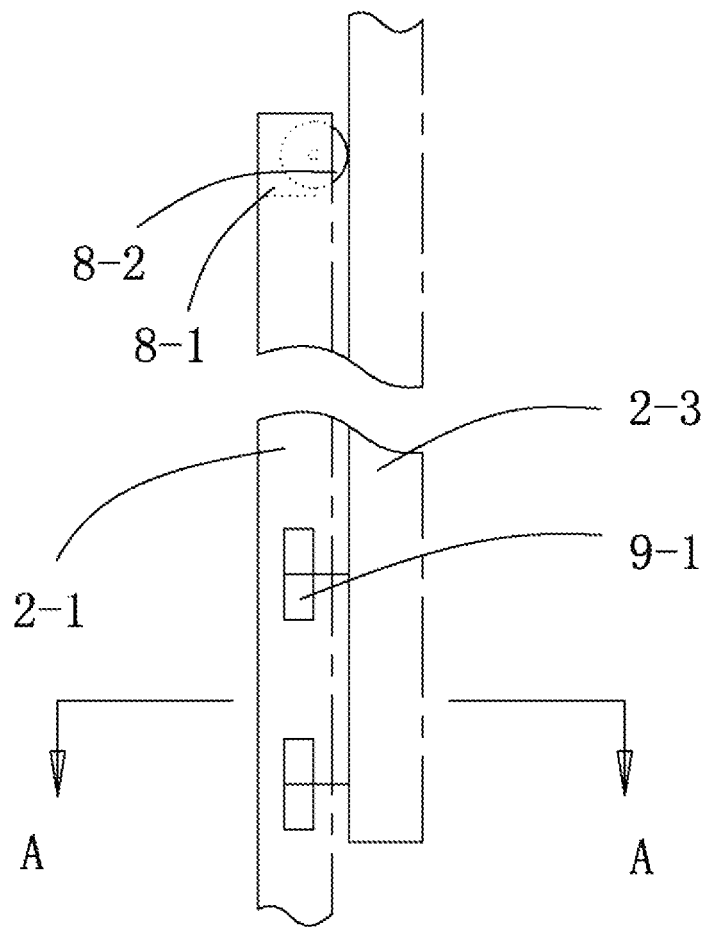
FIGS. 8A and 8B are schematic diagrams of the elevation of the present invention.
Figure 8B:
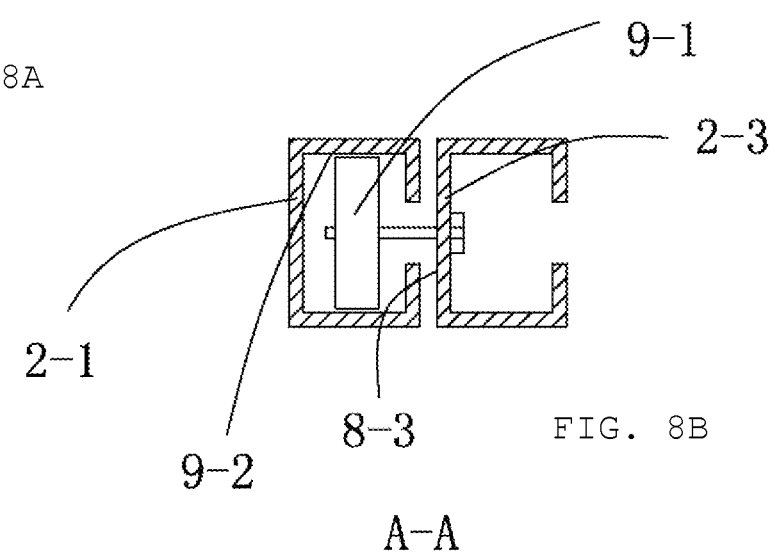
Figure 9:
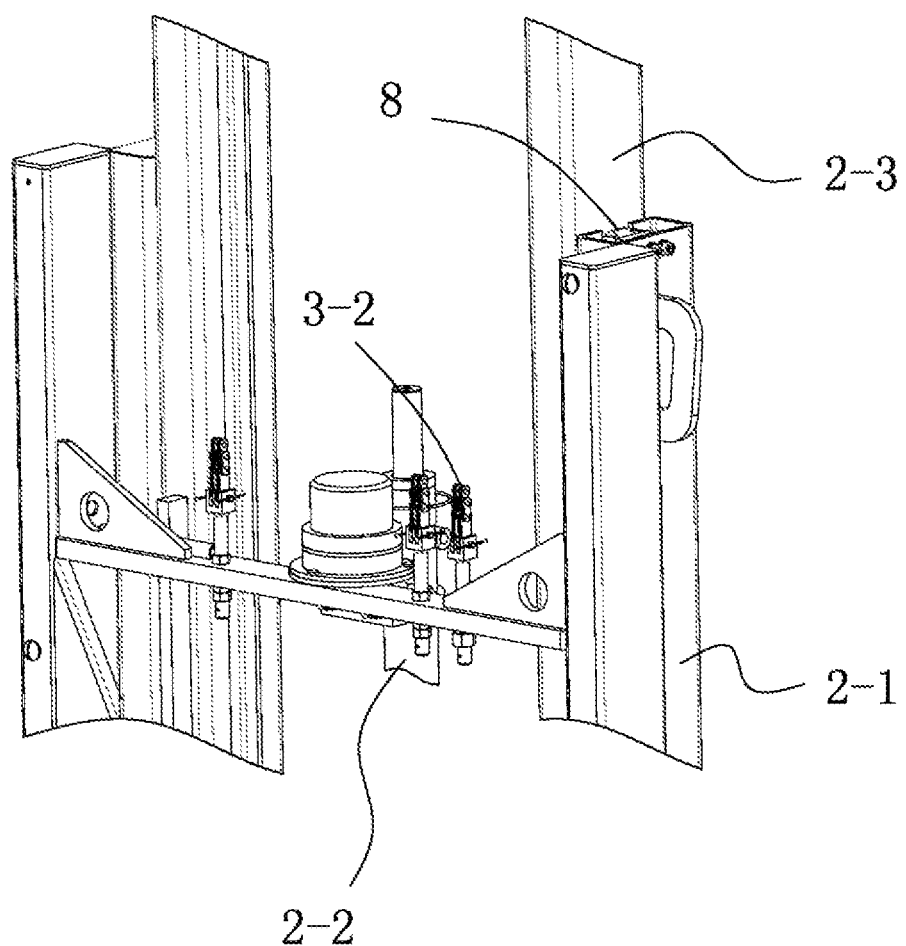
FIG. 9 is the schematic diagram for the three-mast elevation structure according to the present invention (the lower half)
Figure 10:
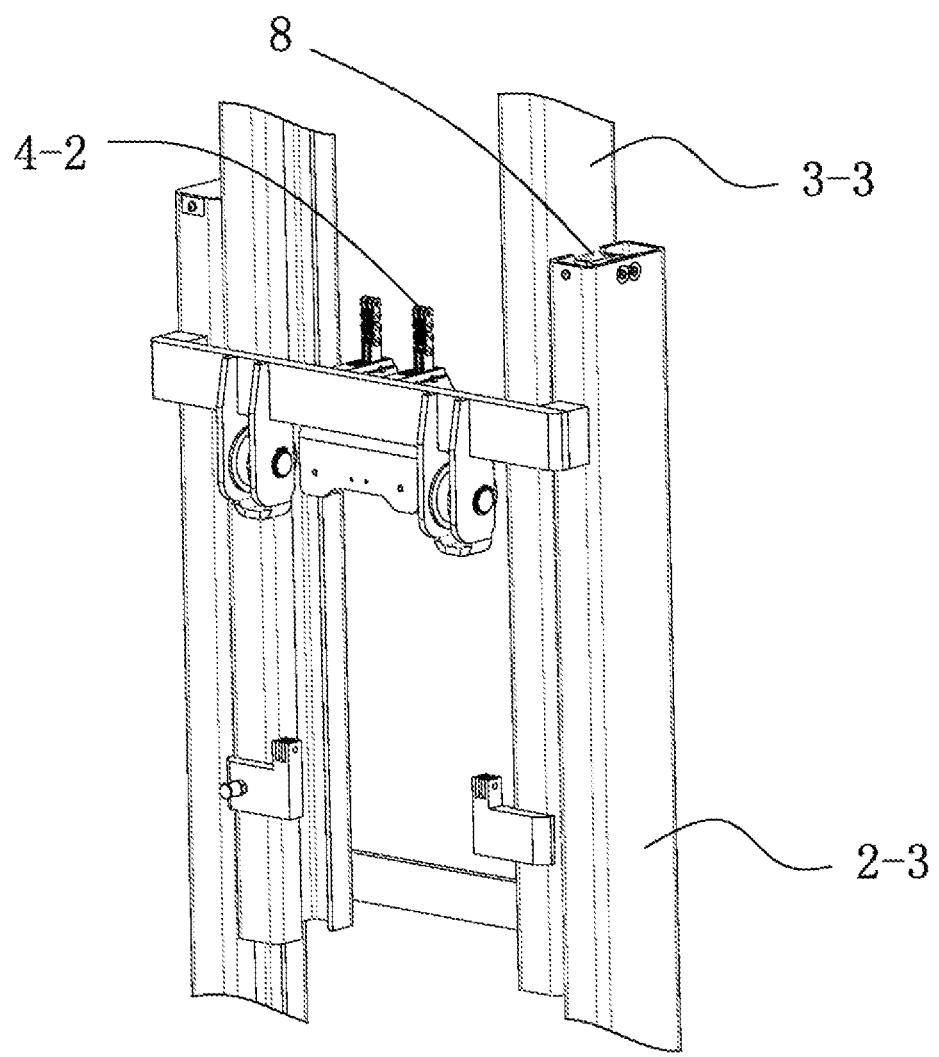
FIG. 10 is the schematic diagram for the three-mast elevation structure according to the present invention (the middle part)
Figure 11:
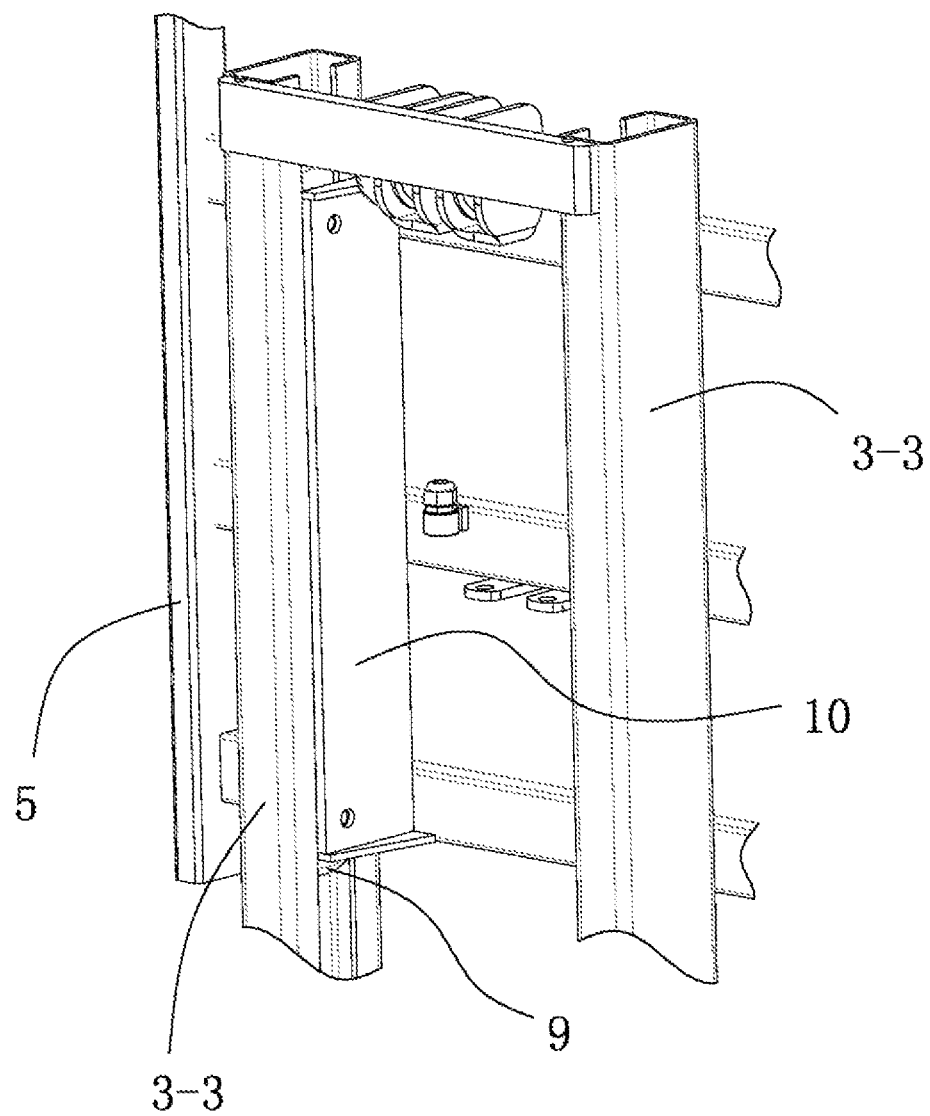
FIG. 11 is the schematic diagram for the three-mast elevation structure according to the present invention (upper half)

FIG. 6 and FIGS. 8-11 show a schematic diagram and elevation principle diagram of a three-mast elevation structure. FIG. 9, FIG. 10 and FIG. 11 are consecutive drawings and should be read together. The elevation structure of the three-mast order picker comprises a hydraulic elevation assembly, a sprocket elevation assembly and a picker platform 5, the hydraulic elevation assembly comprises a fixed mast 2-1, a hydraulic cylinder 2-2 and a movable mast 2-3, and the sprocket elevation assembly comprises a sprocket 3-1 and a chain 3-2. The fixed mast 2-1 is erected and fixed on the chassis 1, and the knockout rod of the hydraulic cylinder 2-2 is connected to the movable mast 2-3 to drive the movable mast 2-3. It also comprises a second movable mast 3-3 as the elevation object of the sprocket elevation assembly and a second sprocket elevation assembly with the picker platform 5 as its elevation object. The second sprocket elevation assembly 4 comprises a second sprocket 4-1 and a second chain 4-2; one end of the chain 3-2 is connected to the fixed mast 2-1 and the other end is connected to the second movable mast 3-3 so that the second movable mast 3-3 is raised and lowered by the raising and lowering of the movable mast 2-3 and with the assistance of the sprocket 3-1 and the chain 3-2. The picker platform 5 is raised and lowered by the raising and lowering of the second movable mast 3-3 and with the assistance of the second sprocket 4-1 and the second chain 4-2. One end of the second chain 4-1 is connected to the movable mast 2-3 and the other end is connected to the picker platform 5; in this case, the elevation ratio is 1:3, i.e. when the hydraulic cylinder 2-2 extends by 0.1 m, the picker platform 5 is raised by 0.3 m. If one end of the second chain 4-1 is connected to the fixed mast 2-1 and the other end is connected to the picker platform 5, the elevation ratio is 1:4.

Figure 7:
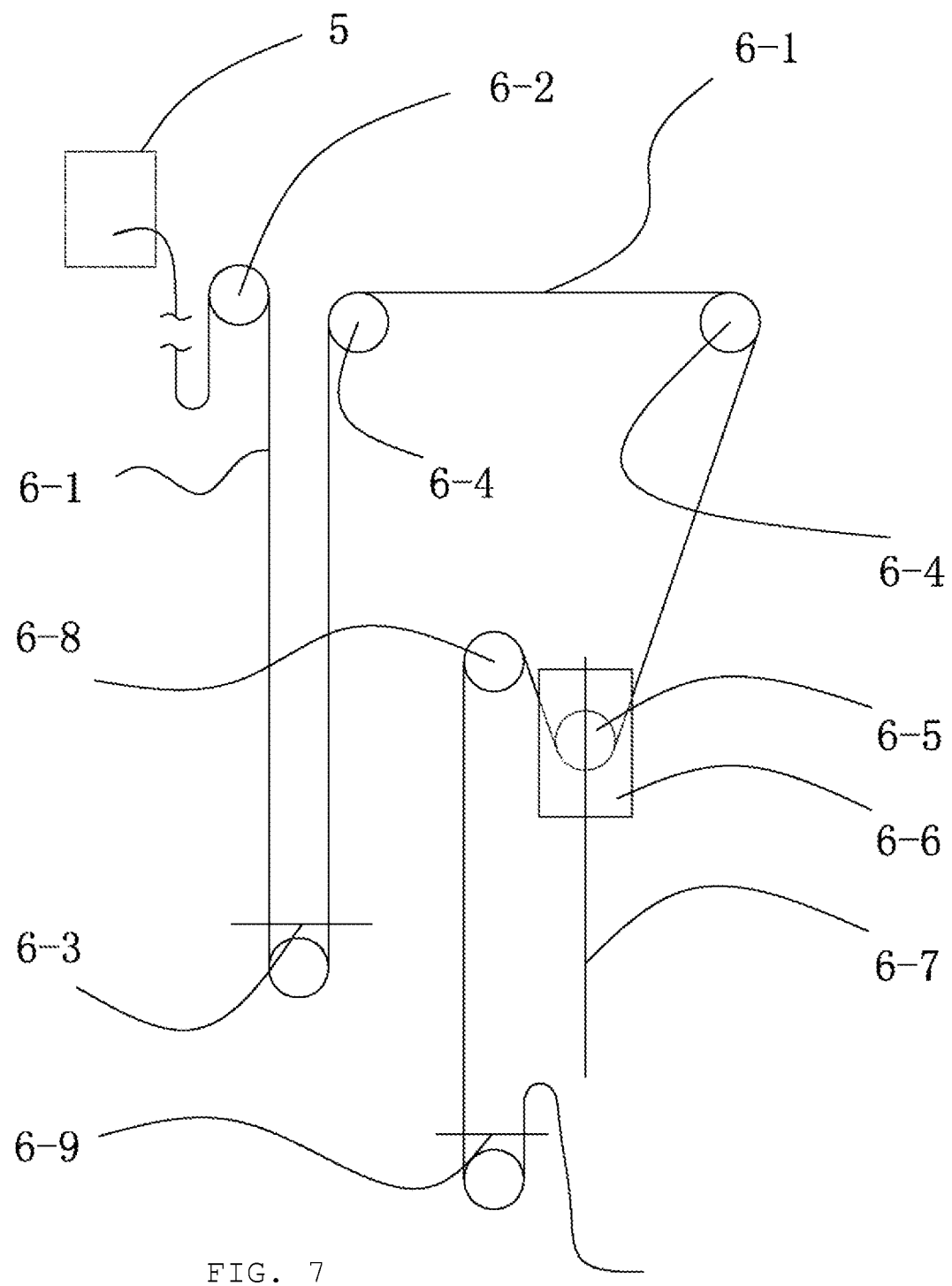
FIG. 7 is a schematic diagram of the wiring mechanism according to the present invention.

To make the elevation more smooth, as shown in FIG. 7 and FIG. 8, between the fixed mast 2-1 and the movable mast 2-3 are provided with one or more guide elements 8 which is/are guided by the corresponding piece(s). The guide element(s) 8 is/are the wide roller(s) mounted on the fixed mast 2-1 through the mount 8-1 while the corresponding piece(s) is/are the plane(s) 8-3 formed by the external surface of the movable mast 2-3. In elevation, rolling friction is generated between the plane(s) 8-3 and the wide roller(s) 8-2 so that the wide roller(s) mounted on the fixed mast 2-1 is/are not raised and lowered while the plane(s) 8-3 formed by the external surface of the movable mast 2-3 is/are raised or lowered.

Between the fixed mast 2-1 and the movable mast 2-3 are also provided with directional elements 9 which are guided by the corresponding pieces; the directional elements 9 are the directional wheels 9-1 arranged on the movable mast 2-3 while the corresponding pieces are the C-like folded faces 9-2 formed by the internal surface of the fixed mast 2-1. The diameter of the directional wheels 9-1 is less than the width of the C-like folded faces. In elevation, rolling friction is generated between the directional wheels 9-1 and one face of the C-like folded faces so that the directional wheels mounted on the movable mast 2-3 are raised and lowered while the C-like folded faces 9-2 formed by the internal surface of the fixed mast 2-1 are not raised or lowered.

The guide elements 8 are mounted at the upper part of the fixed mast 2-1 and the directional elements 9 are mounted at the lower part of the movable mast 2-3; in elevation, when the directional elements 9 contact the mounts of the guide elements 8, the two-mast structure is at the maximum height.

To make the elevation smoother, as shown in FIG. 10, the arrangement between the movable mast 2-3 and the second movable mast 3-3 is the same as that between the fixed mast 2-1 and the movable mast 2-3. The specific structure is as described above, i.e. not only comprising guide elements 8, but also comprising directional elements 9.

Likewise, to make the elevation smooth, as shown in FIG. 11, between the second movable mast 3-3 and the picker platform 5 are also provided with multiple directional elements 9 which are guided by the corresponding pieces. The directional elements 9 are rollers 9-1 with an appropriate diameter, arranged on the mounting plate 10, the mounting plate 10 is arranged on the picker platform 5 and kept in parallel with the second movable mast 3-3, the axle of the directional wheels 9-1 is kept vertical to the side face of the picker platform 5, and the corresponding piece of the directional elements 9 is formed by the internal surface of the post of the second movable mast 3-3, i.e. the directional element 9 is arranged inside the post of the second movable mast 3-3.

The present invention is also provided with an alarm which comprises the limit switch arranged at the bottom of the fixed mast, the limit switches arranged at the side of the brake prop feet and the sensor switch arranged on the split-type dual front door. When the masts are lowered to a certain position and press the limit switch at the bottom of the fixed mast, the alarm will not be actuated. When the masts are raised and the pressure on the limit switch at the bottom of the fixed mast is removed, pushing the split-type dual front door or releasing the brake prop feet will actuate the alarm to alert the operator and people around it. It is because that when the split-type dual front door is pushed, the sensor switch is turned on. When the brake prop feet are released, the brake prop feet are brought to contact the limit switch arranged at the side of the brake prop feet; however, if the brake prop feet are actuated, the brake prop feet will not contact the limit switch.

Embodiment II

Figure 4:
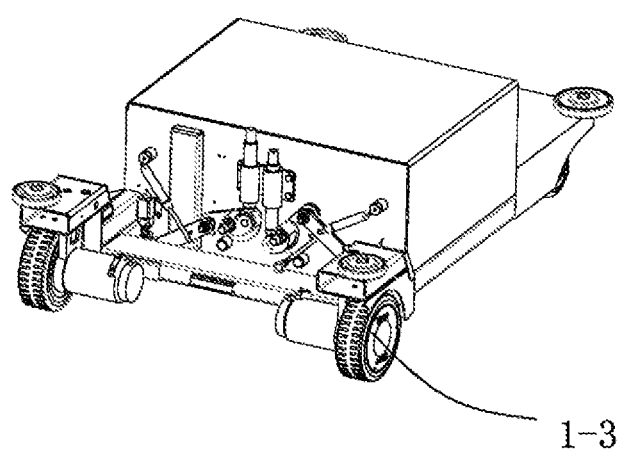
FIG. 4 is a general arrangement of the pothole assembly according to the present invention.
Figure 12:
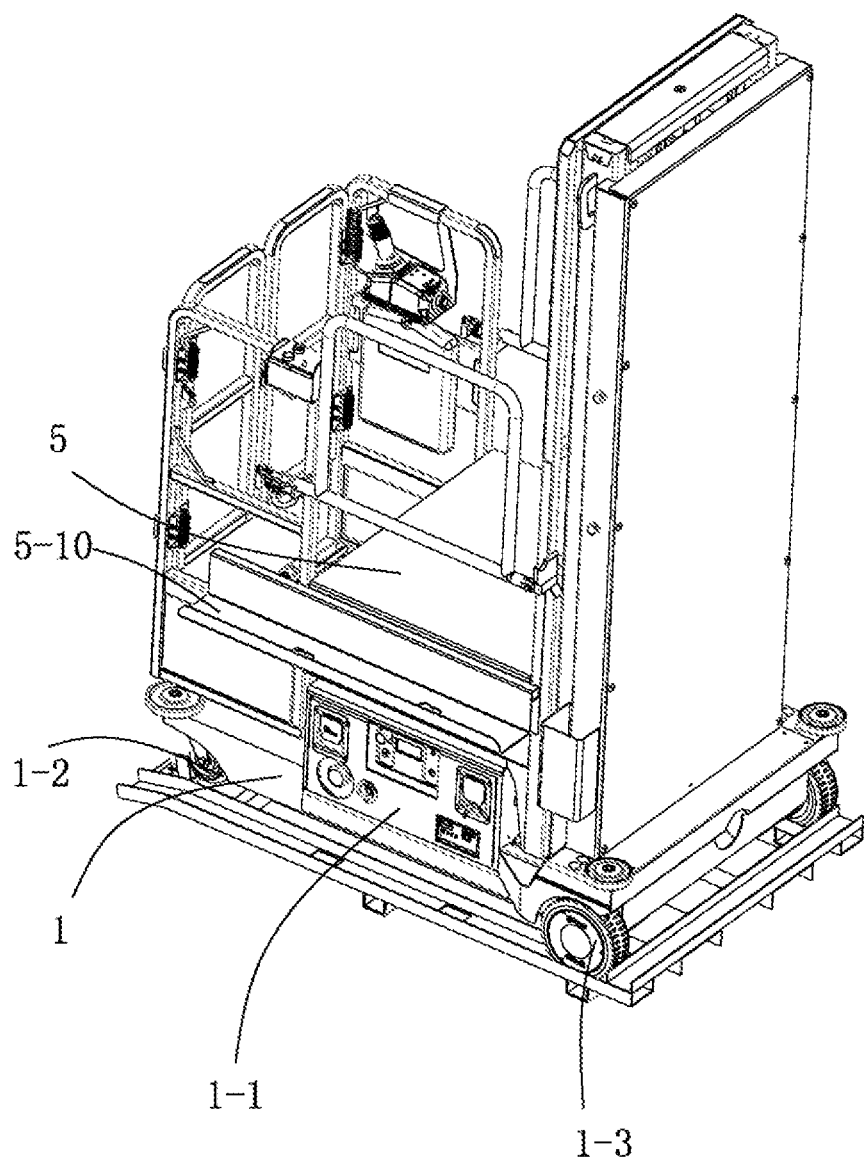
FIG. 12 is an overall structural diagram of Embodiment II according to the present invention.

An order picker, having a chassis 1, an elevation structure and a picker platform 5. The overall structure is as shown in FIG. 12, the same as that in Embodiment I, but the difference is that the order picker is self-driven, driven by the two rear driving directional wheels 1-3 as shown in FIG. 4 and driven in a non-coaxial way, and each of the wheels is driven by a separate motor so that the forward, backward and steering motions of the order picker are determined by the direction of rotation and the difference of rotation speed of the two rear driving directional wheels 1-3. For example, when the two rear driving directional wheels 1-3 have the same rotation direction and difference of rotation speed, the order picker moves forward or backward in a straight line; if both wheels rotate forward and the speed of the left wheel is greater than that of the right wheel, the order picker turns right while moving forward.

Figure 5:
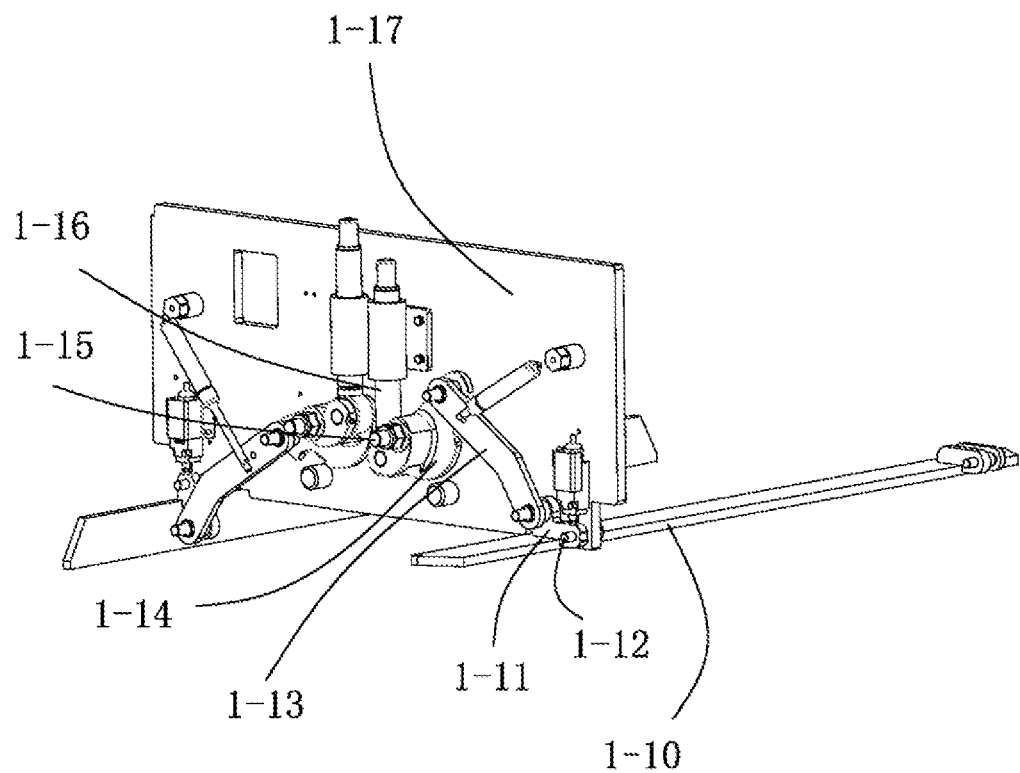
FIG. 5 is a structural diagram of the pothole assembly according to the present invention.
Figure 6:
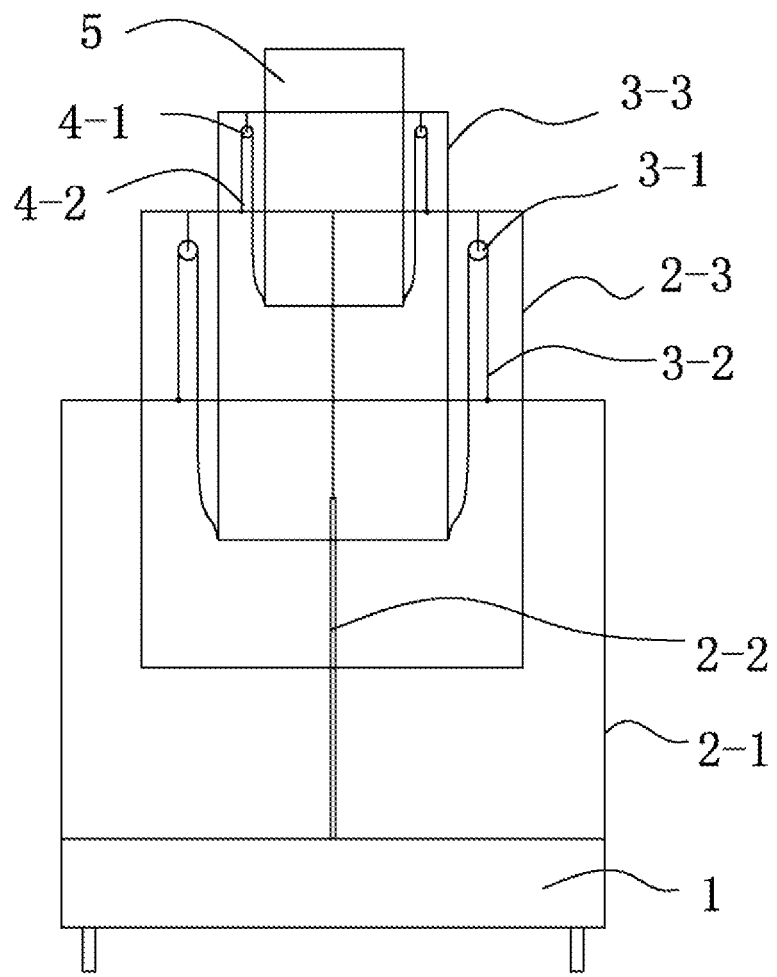
FIG. 6 is a schematic diagram of the elevation principle of the three masts according to the present invention.

Another difference is that, as shown in FIG. 5, the chassis 1 is also provided with a pothole assembly which comprises a flip 1-10, a jack catch 1-11, a lower link 1-13, a middle link 1-14 and struts 1-16, wherein the upper end of the strut 1-16 movably mounted in a bushing is to be pressed by the picker platform 5 while the lower end props against the roller rotatably connected to one end of the middle link 1-14, the other end of the middle link 1-14 is rotatably connected to one end of the lower link 1-13, the other end of the lower link 1-13 is movably connected to one end of the jack catch 1-11, and the jack catch 1-11 is intended for catching or being welded to the flip 1-10. The middle of the middle link 1-14 is rotatably connected to the base plate 1-17 through a first axle 1-15, and the other end of the jack catch 1-11 is rotatably connected to the base plate 1-17 through the second axle 1-12. When the picker platform 5 is lowered, the top end of the strut 1-16 is pressed so that force is transmitted to one end of the middle link 1-14 through the roller(s), to the other end of the middle link 1-14 through the rotation of the middle link 1-14 and then to the lower link 1-13 which transmits a part of the force to the jack catch 1-11 and the other part of the force to the gas rod, and the gas rod is retracted and accumulates potential energy. At the same time, the jack catch 1-11 welded to the flip 1-10 stows the flip 1-10; when the picker platform is raised, the pressure applied on the top end of the strut 1-16 is removed, the potential energy stored in the gas rod is converted to actuate the gas rod which acts on the lower link 1-13 by means of force to drive the flip 1-10 to erect and restores the strut 1-16 through force transmission to be pressed again by the picker platform 5. When the flip 1-10 is erected, it can prevent the overall machine from falling into potholes.

What is claimed is:

1. A three-mast order picker, comprising a chassis, a hydraulic elevation assembly, a sprocket elevation assembly, a picker platform and a wiring mechanism, the hydraulic elevation assembly comprises a fixed mast, a hydraulic cylinder and a movable mast, and the sprocket elevation assembly comprises a sprocket and a chain,
wherein the fixed mast is erected and fixed on the chassis, and the hydraulic cylinder comprises a knockout rod that is connected to the movable mast to drive the movable mast, characterized in that, the three-mast order picker also comprises a second movable mast as the elevation object of the sprocket elevation assembly and a second sprocket elevation assembly with the picker platform as its elevation object;
the second sprocket elevation assembly comprises a second sprocket and a second chain,
wherein one end of the chain is connected to the fixed mast and the other end is connected to the second movable mast so that the second movable mast is raised and lowered by the raising and lowering of the movable mast and with the assistance of the sprocket and the chain,
wherein the picker platform is raised and lowered by the raising and lowering of the second movable mast and with the assistance of the second sprocket and the second chain,
wherein the wiring mechanism comprises a wire, a first guide pulley, a first wire fixing point, a second guide pulley/pulley block, a movable pulley, a clump weight, a guide path, a third guide pulley, and a second wire fixing point, wherein the wire comes out from the picker platform and is fixed at the first wire fixing point on the movable mast after its direction is changed by the first guide pulley, is tensioned by the movable pulley after the direction is changed by the second guide pulley/pulley block, and is fixed at the second wire fixing point onto the bottom of the fixed mast or the chassis to form the second wire fixing point after passing through the third guide pulley, wherein the second guide pulley/pulley block is mounted on the movable mast, the second movable pulley is rotatably mounted on the clump weight, the clump weight is slidingly mounted on the guide path, and the guide path is fixed on the bottom of the fixed mast or the chassis.

2. The three-mast order picker as claimed in claim 1, characterized in that one end of the second chain is connected to the movable mast and the other end is connected to the picker platform.

3. The three-mast order picker as claimed in claim 1, characterized in that the chassis is provided with two front driven omni-directional wheels and two rear driving directional wheels, wherein the two rear driving directional wheels drive the order picker in a non-coaxial way so that the forward, backward and steering motions of the order picker are determined by the direction of rotation and the difference of rotation speed of the two rear driving directional wheels.

* * * * *